June 23, 1959 — J. YOUNG, JR — 2,892,111

STATOR AND END CAP THEREFOR

Original Filed Jan. 23, 1957 — 5 Sheets-Sheet 1

INVENTOR
JOHN YOUNG, JR.
BY Victor N. Borst
ATTORNEY

June 23, 1959  J. YOUNG, JR  2,892,111
STATOR AND END CAP THEREFOR
Original Filed Jan. 23, 1957  5 Sheets-Sheet 2

INVENTOR
JOHN YOUNG, JR
BY
ATTORNEY

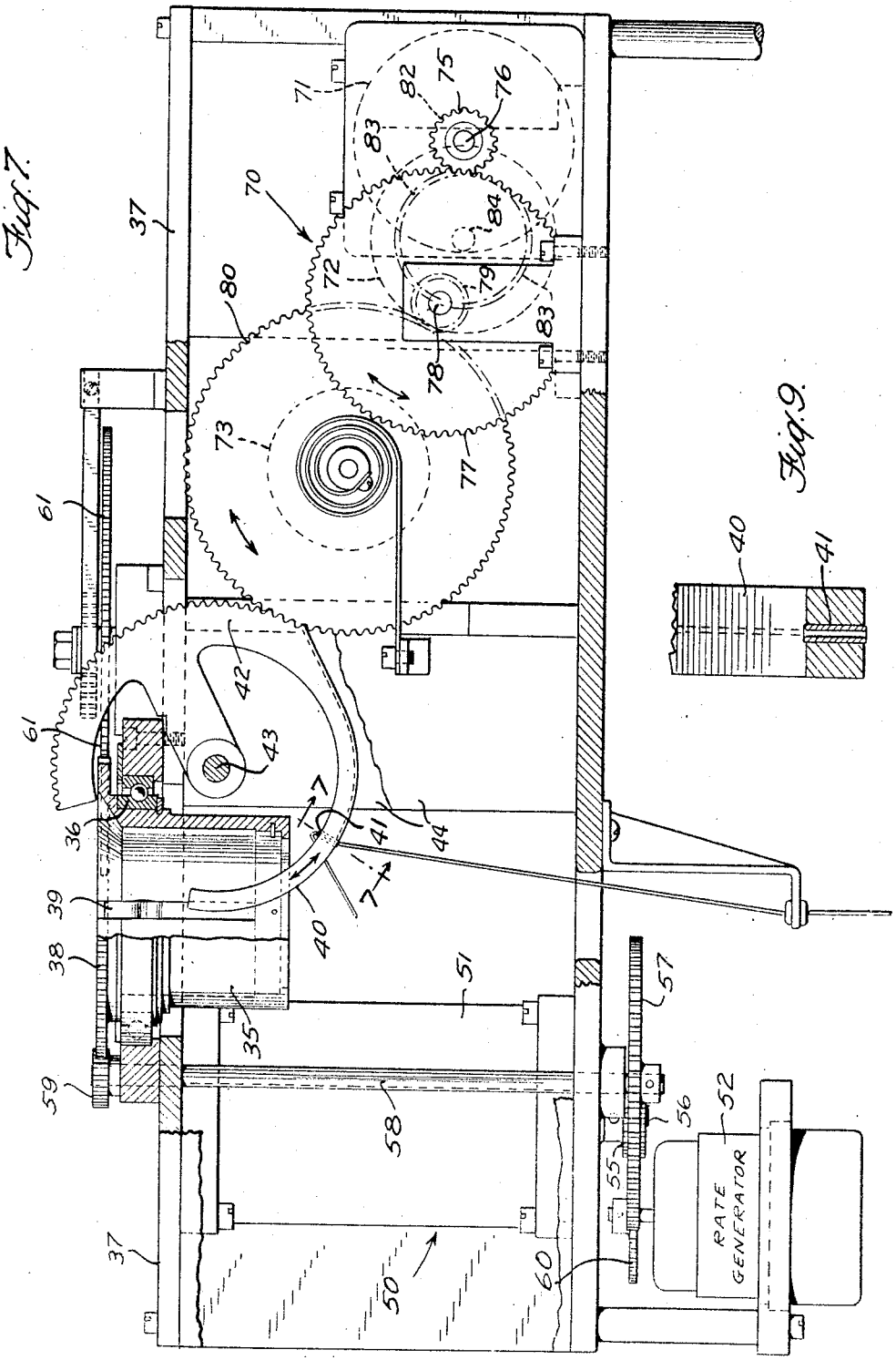

June 23, 1959         J. YOUNG, JR         2,892,111
STATOR AND END CAP THEREFOR
Original Filed Jan. 23, 1957         5 Sheets-Sheet 5
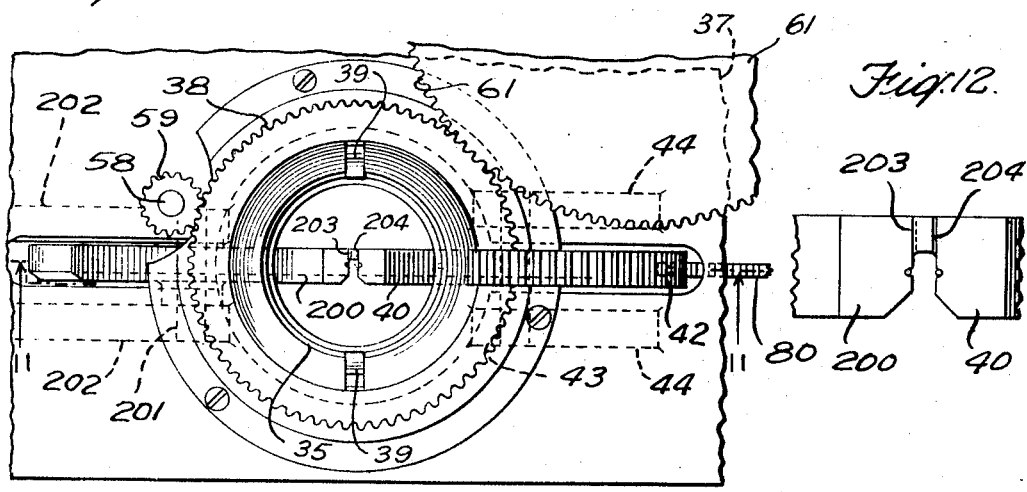
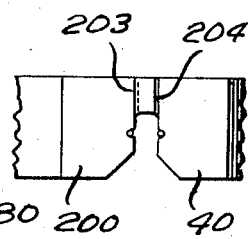
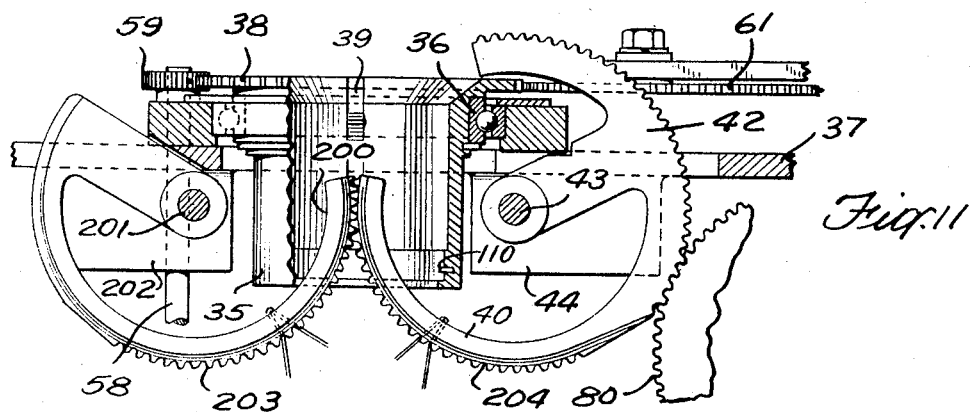
INVENTOR
JOHN YOUNG, JR
BY
ATTORNEY

United States Patent Office 2,892,111
Patented June 23, 1959

2,892,111
STATOR AND END CAP THEREFOR

John Young, Jr., Corona, N.Y., assignor to Sperry Rand Corporation, Ford Instrument Company Div., Long Island City, N.Y., a corporation of Delaware Original application January 23, 1957, Serial No. 635,756, now Patent No. 2,835,453, dated May 20, 1958. Divided and this application May 27, 1958, Serial No. 738,186

13 Claims. (Cl. 310—195)

This invention relates to stators for small electrical apparatus such as motors, generators, resolvers, synchros and similar apparatus; and this application is a division of my copending application Serial No. 635,756 which was filed on January 23, 1957, and on which Patent No. 2,835,453 was issued on May 20, 1958.

The principal object of the invention is to provide a stator for small electrical apparatus which is much cheaper to manufacture than prior known stators.

Another object of the invention is to provide a stator of this character that can be wound more uniformly in less space.

Another object of the invention is to provide a stator of the aforesaid character which is so constructed and arranged that winding therefor can be wound directly onto the stator shell instead of onto a bobbin from which it is transferred to the shell, and in which the wire loops can be more evenly distributed about the ends of the stator between the slots therein.

Still another object of the invention is to provide a novel type of end cap for stator shells by which the accomplishment of the aforesaid objects is facilitated.

Having stated the principal objects of the invention other and more limited objects thereof will be apparent from the following specification and the accompanying drawings forming a part thereof in which:

Fig. 7 is a front elevation, partially broken away, of the winding mechanism shown in Fig. 1;

Fig. 9 is an enlarged fragmentary detail sectional view through the winding finger showing the threading nozzle, the plane of the section being indicated by the line 9—9 on Fig. 7;

Fig. 10 is a fragmentary plan view of a modified form of the winding mechanism, shown in Figs. 6 and 9, in which two winding fingers are employed;

Fig. 11 is a fragmentary vertical sectional view, through the mechanism shown in Fig. 10, taken substantially on the line 11—11 on Fig. 10; and Fig. 12 is an enlarged fragmentary detail plan view showing the manner in which the two winding fingers of Figs. 10 and 11 are geared together for operation in unison.

In accordance with my present invention I provide a stator shell S having a plurality of equally spaced radially extending helically inclined slots therein which are consecutively numbered from 1 to 20 with a pair of similar end caps C, one of which is secured to each end of the stator shell S. Each of these end caps C comprises a base 25 having three concentric annular grooves or zones 29, 30 and 31 in the upper surface thereof and three upwardly and outwardly extending concentric conical annular flanges 26, 27 and 28, one of which is disposed around the inner edge of each of these zones. These flanges progressively increase in height from the innermost flange outwardly, and are provided with radially extending vertical slots 32 which are adapted to register with certain preselected slots in the stator shell S to which the caps C are applied. The number and location of the slots 32 in the flanges 26, 27 and 28 are dependent upon the sequence in which various preselected pairs of slots are to be wound.

Figure 2:
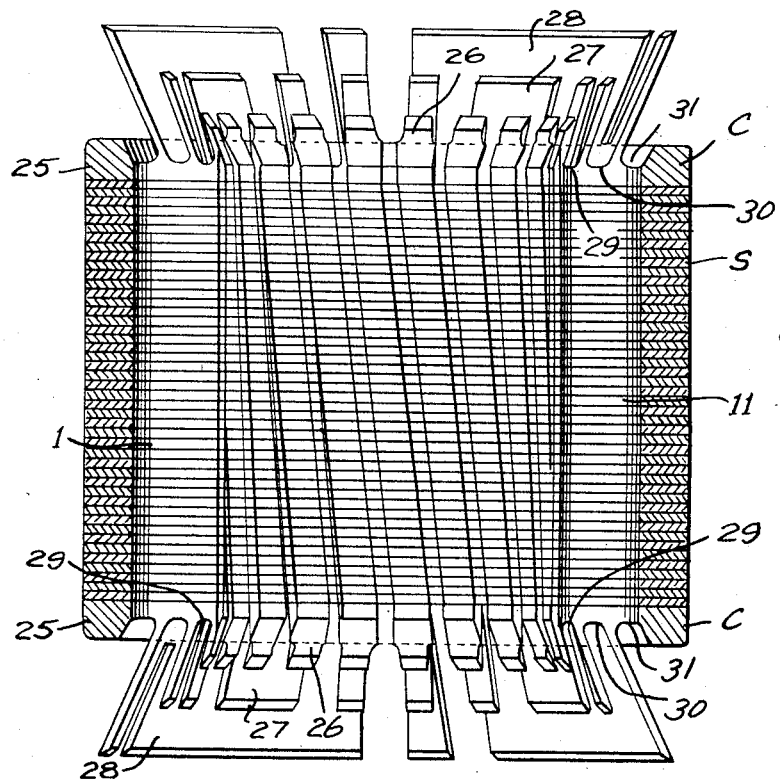
Fig. 2 is a vertical sectional view through the stator as shown in Fig. 1, the plane of the section being indicated by the line 2—2 on Fig. 1.
Figure 1:
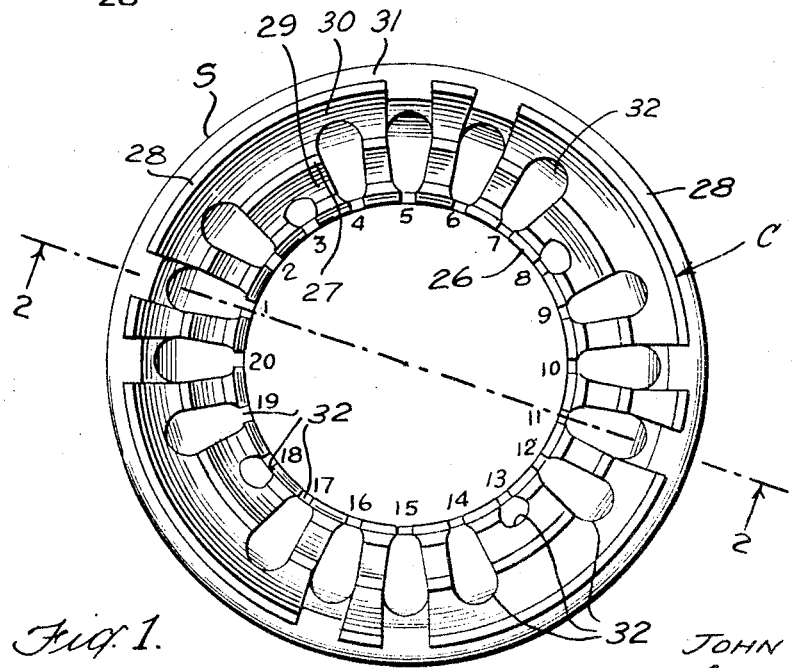
Fig. 1 is a plain view of a stator constructed according to my invention showing it before the windings have been applied thereto.
Figure 3:
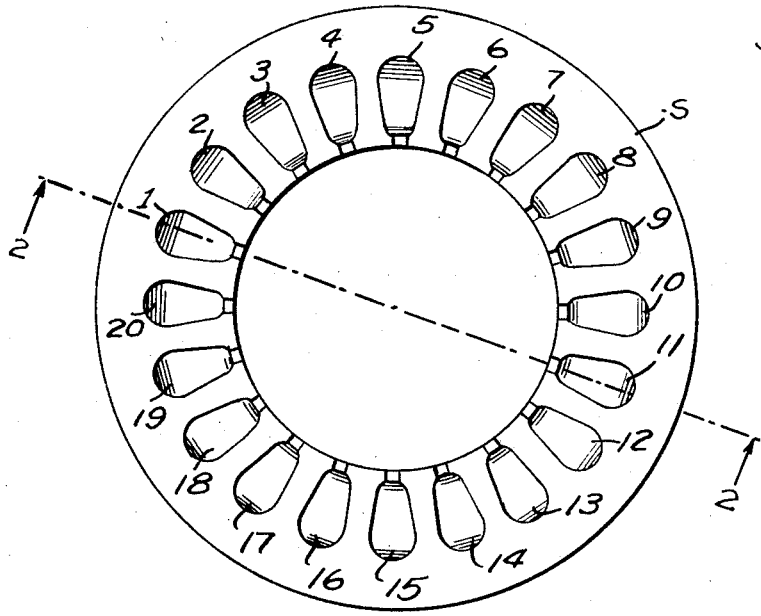
Fig. 3 is a plan view of the stator shell showing it before the end caps have been applied thereto.
Figure 4:
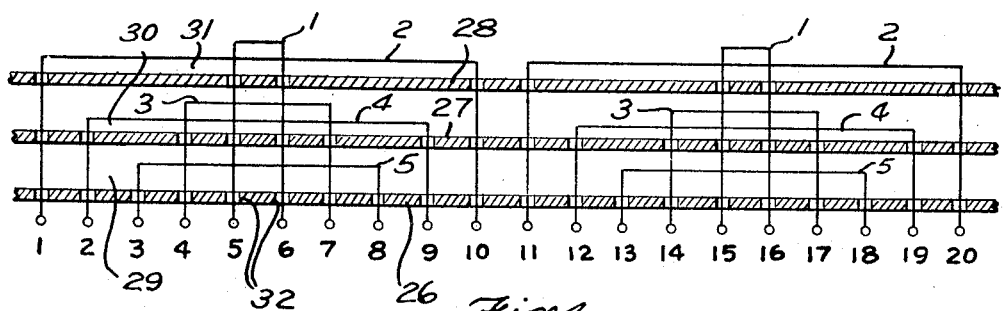
Fig. 4 is a diagrammatic view in plan illustrating the manner in which selected pairs of stator shell slots are successively wound.
Figures 5, 8:
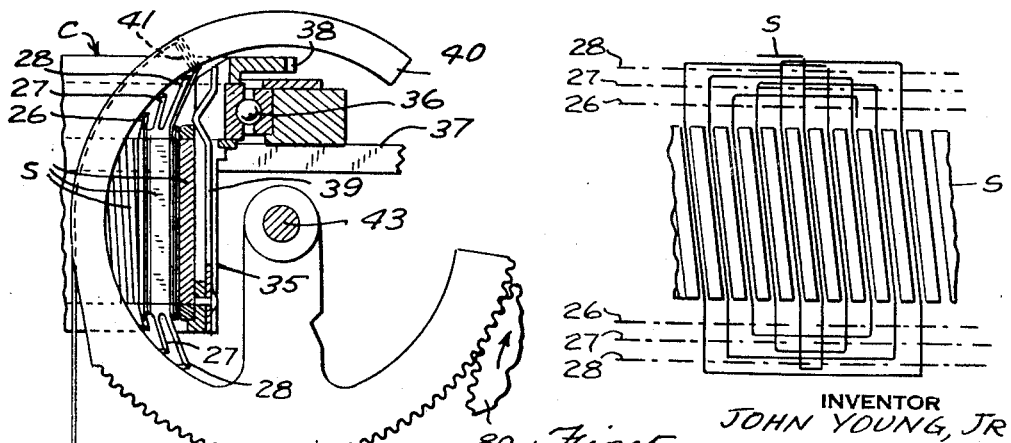
Fig. 5 is a diagrammatic view in elevation further illustrating the sequential winding of selected pairs of shell slots.
Fig. 8 is a fragmentary vertical sectional view showing a stator being wound.
Figure 6:
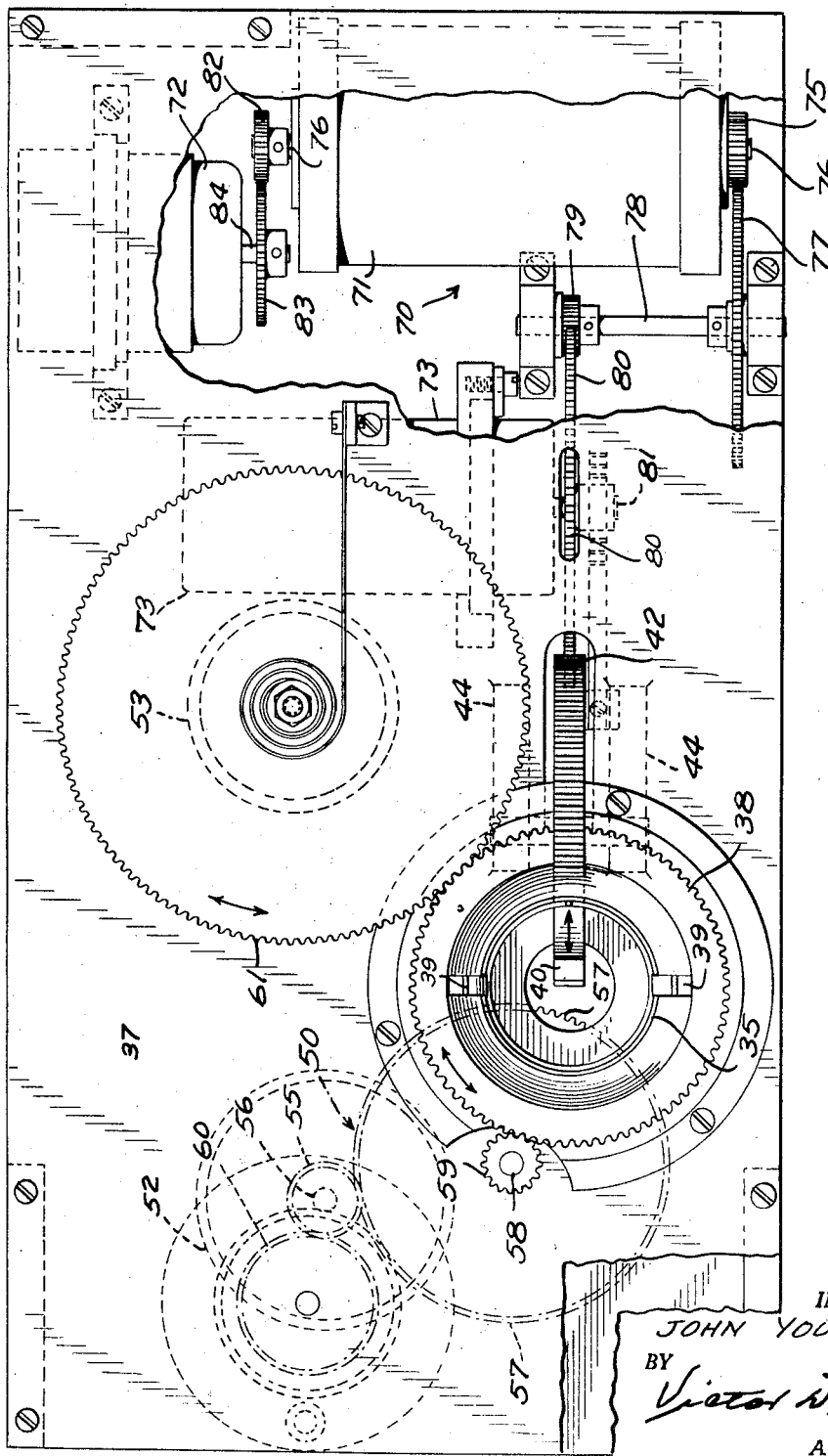
Fig. 6 is a plan view, partially broken away, of a winding mechanism which is especially adapted for winding stators in accordance with this invention.

As shown herein in Figs. 4 and 5, a plurality of loops of winding wire are first wound in the slots 5 and 6 and then in the slots 1 and 10 with the upper and lower ends of the winding loops being disposed in the outermost zones 31 behind the outermost flanges 28 of the end caps C. The slots 4 and 7 and then the slots 2 and 9 are next wound with the upper and lower ends of the winding loops being disposed in the intermediate zones 30 behind the intermediate flanges 27 of the caps C. Finally the slots 3 and 8 are wound with the upper and lower ends of the loops being disposed in the innermost zone 29 behind the flanges 26 of the end caps C. After the first ten slots have been wound the other ten slots are wound in the following sequence: 15 and 16, 11 and 20, 14 and 17, 12 and 15, and finally 13 and 18. The upper and lower ends of the loops between the slots 15 and 16, and between the slots 11 and 20 are disposed in the outermost zones 31 of the end caps C. The upper and lower ends of the winding loops between the slots 14 and 17 and between the slots 12 and 19 are disposed in the intermediate zones 30 of the end caps C, and the upper and lower ends of the winding loops between the slots 13 and 18 are disposed in the innermost zones 29 of the end caps C.

The innermost flanges 26 of the end caps C therefore have twenty slots 32 therein which register with all of the slots 1 to 20 in the shell S. The intermediate flanges 27 have sixteen slots 32 therein which are adapted to register with the stator shell slots 1 and 2, 4 to 7, 9 to 12, 14 to 17, and 19 and 20; and the outermost flanges 28 have eight slots therein which are adapted to register with the shell slots 1, 5, 6, 10, 11, 15, 16 and 20, respectively. If it is desired to wind preselected pairs of shell slots in a different sequence the flanges 26, 27 and 28 will then be slotted accordingly.

The winding mechanism shown herein by which stator shells S having a plurality of equally spaced radially extending slots 1 to 20 therein are automatically wound in the sequence as above stated will now be described with reference to the drawings. This winding mechanism comprises a vertically disposed open ended cylindrical cage 35 which is rotatably supported by an anti-friction bearing 36 which is suitably secured in fixed position on a table 37. The cage 35 is provided with an annular gear flange 38 around the upper end thereof through which the cage 35 is rotated back and forth during operation. The cage 35 is adapted to receive and hold a stator shell S, having the end caps C applied thereto, in a definite fixed position by means of a dowel 110 and a pair of spring fingers 39 carried by the cage 35.

A winding finger 40 having a threading nozzle 41 is formed integrally with or otherwise secured to a segmental gear 42 which is rotatably mounted upon a horizontal shaft 43 carried by brackets 44 secured to and extending downwardly from the underside of the table 37. The finger 40 and gear 42 are disposed radially with respect to the cage 35 with the finger 40 extending up through the open lower end of the cage 35 and a stator shell S therein. In operation the segmental gear 42 and the finger 40 carried thereby are rotated back and forth between the lower position of the finger 40 as shown in Fig. 5 and the upper position as shown in Fig. 8, which carries the threading nozzle 41 alternately up and down through the stator shell S in the cage 35.

The finger 40 with the nozzle 41 carried thereby, and the cage 35 with the stator shell S therein, are actuated in sequentially timed relation with respect to each other by two servo mechanisms which are generally indicated by the numerals 50 and 70. The servo mechanism 50 which rotates the cage 35 back and forth about a vertical axis during operation comprises the servo motor 51, the rate generator 52, the resolver 53 and the servo control and amplifier 54. The cage 35 is driven by the servo motor 51 through a pinion gear 55 which is secured to the armature shaft 56 of the servo motor 51, the gear 57 which is secured to the lower end of a shaft 58 in mesh with the gear 55, and a gear 59 which is secured to the upper end of the shaft 58 in mesh with the gear 38 carried by the cage 35. The rate generator 52 is driven by the servo motor 51 through a gear 60 which meshes with the pinion gear 55, and the resolver 53 is driven through a gear 61 which meshes with the cage gear 38. The servo mechanism 70 which rotates the finger 40 and nozzle 41 up and down a horizontal axis during operation comprises the servo motor 71, the rate generator 72, the resolver 73, and the servo control and amplifier 74. The finger 40 is driven by the servo motor 71 through a pinion gear 75 which is secured to the armature shaft 76 of the servo motor 71, the gear 77 which is secured to one end of a horizontal shaft 78 in mesh with the gear 75, a gear 79 which is secured to the other end of the shaft 78 in mesh with a gear 80 which in turn meshes with the segmental gear 42 to which the finger 40 is secured. The resolver 73 is driven by the gear 80 which is secured to the rotor shaft 81 thereof. The rate generator 72 is driven by the servo motor 71 through a pinion gear 82 which is secured to the other end of the servo motor armature shaft 72 and a meshing gear 83 secured to the rotor shaft 84 of the rate generator 72. The timed sequential operation of the servo mechanisms 50 and 70 is controlled by a suitable programming mechanism, which determines the order in which the pairs of stator slots are wound and the number of winding loops which are wound in each pair of stator slots. One such programming mechanism is shown in my aforesaid co-pending application, and since it per se forms no part of the present invention it is not shown and described in detail herein.

In Figs. 10 to 12 of the drawings I have shown a slightly modified form of winding mechanism in which a second winding finger 200, similar to the winding finger 40, is employed. The winding finger 200 is disposed in alignment with the finger 40 and is rotatably mounted upon a suitable shaft 201 carried by brackets 202 secured to and extending downwardly from the underside of the table 37. The finger 200 is provided with gear teeth 203 which mesh with gear teeth 204 on the finger 40, through which the finger 200 is driven in unison with the finger 40 by the gear 80. The finger 200 will then wind the slots 11 to 20 simultaneously with the winding of the slots 1 to 10 by the finger 40 in the following order as is diagrammatically shown in Fig. 8. While the finger 40 is winding the slots 5 and 6 the finger 200 will wind the slots 15 and 16; while the finger 40 is winding the slots 1 and 10 the finger 200 will wind the slots 11 and 20; while the finger 40 is winding the slots 4 and 7 the finger 200 will wind the slots 14 and 17; while the finger 40 is winding the slots 2 and 9 the finger 200 will wind the slots 12 and 19, and while the finger 40 is winding the slots 3 and 8 the finger 200 will wind the slots 13 and 18. This will eliminate the necessity of rotating stator shell S and the cage 35 180° after the slots 1 to 10 have been wound preparatory for the winding of slots 11 to 20, and will materially decrease the time required for completely winding a stator shell. In this form of the invention the fingers 40 and 200 and the cage 35 are all driven in timed sequential relation with respect to each other by the same actuating and control mechanism used in connection with the form of winding mechanism shown in Figs. 1 to 9.

From the foregoing, it will be apparent to those skilled in this art that I have provided a very simple stator mechanism of the character described by which the objects of the invention are accomplished.

And it is to be understood that I am not limited to the specific construction shown and described herein, as various modifications may be made therein within the spirit of the invention and the scope of the appended claims.

What is claimed is:

1. An end cap for stators of electrical apparatus which cap comprises a circular ring shaped base having inner and outer peripheral edges; a plurality of radially spaced concentric annular flanges extending outwardly from one side of said base; said flanges dividing said one side into an outer zone, an inner zone and an intermediate zone; and a plurality of angularly spaced vertical slots extending through said base and said flanges and radially outwardly from said inner peripheral edge; said slots being adapted to register with slots in a stator shell to which the cap is applied.

2. A stator for electrical apparatus comprising a stator shell having a plurality of equally spaced radially extending slots therein, a pair of end caps one of which is applied to each end of said stator shell; each of said end caps comprising a circular ring shaped base having inner and outer peripheral edges; a plurality of radially spaced concentric annular flanges extending outwardly from one side of said base; said flanges dividing said one side into an outer zone, an inner zone and an intermediate zone; and a plurality of angularly spaced vertical slots extending through said base and said flanges and radially outwardly from said inner peripheral edge; said slots being disposed in register with the slots in said stator shell; a plurality of rectangular loops of winding wire vertically wound in selected pairs of registering shell and cap slots with the upper and lower sections of said loops being disposed in the said outer zones of said end caps, a plurality of other rectangular loops of winding wire vertically wound into other selected pairs of registering shell and cap slots with the upper and lower sections of said other loops being disposed in the said intermediate zones of said end caps, and a plurality of still other rectangular loops of winding wire vertically wound into still other selected pairs of registering shell and cap slots with the upper and lower sections of said still other loops being disposed in the said inner zones of said end caps.

3. A stator as defined in claim 2 in which the said annular flanges of said end caps progressively increase in diameter from the bases of said end caps outwardly.

4. A stator as defined in claim 3 in which said annular flanges of said end caps progressively increase in height from the innermost flange outwardly.

5. An end cap for stators as defined in claim 1 in which the said annular flanges progressively increase in diameter from said base upwardly.

6. An end cap for stators as defined in claim 5 in which said annular flanges progressively increase in height from the innermost flange outwardly.

7. A stator for electrical apparatus comprising a stator shell having a plurality of equally spaced radially extending slots therein, means defining an outer annular zone, an inner annular zone and an intermediate annular zone applied to each end of said stator shell, a plurality of rectangular loops of winding wire vertically wound into selected pairs of shell slots with the upper and lower sections of said loops disposed in said outer zones, a plurality of other rectangular loops of winding wire vertically wound into other selected pairs of shell slots with the upper and lower sections of said other loops being disposed in said intermediate zones, and a plurality of still other rectangular loops of winding wire vertically wound into still other selected pairs of shell slots with the upper and lower sections of said still other loops disposed in said inner zones.

8. An end cap for stators of electrical apparatus which is adapted to be applied to each end of a stator shell having a plurality of equally spaced radially extending slots therein, said end cap comprising a circular ring shaped base having inner and outer peripheral edges, an inner annular flange, an outer annular flange and an intermediate annular flange, said flanges being secured to and extending outwardly from one side of said base in concentric radially spaced relation to each other and dividing said one side into an outer zone, an intermediate zone and an inner zone, said base and said inner flange having a plurality of radially extending slots which are adapted for registration with all of the slots in a stator shell to which the end cap is applied, said base and said intermediate flange having a lesser number of radially extending slots which are adapted for registration with certain preselected slots in said stator shell, and said base of said outer flange having a still lesser number of radially extending slots which are adapted for registration with certain other preselected slots in said stator shell.

9. A stator for electrical apparatus comprising a stator shell having a plurality of equally spaced radially extending slots therein, a pair of end caps one of which is applied to each end of said stator shell; each of said end caps comprising a circular ring shaped base having inner and outer peripheral edges, an inner annular flange, an outer annular flange and an intermediate annular flange, said flanges being secured to and extending outwardly from one side of said base in concentric radially spaced relation to each other and dividing said one side into an outer zone, an intermediate zone and an inner zone, said base and said inner flange having a plurality of radially extending slots which are adapted for registration with all of the slots in a stator shell to which the end cap is applied, said base and said intermediate flange having a lesser number of radially extending slots which are adapted for registration with certain preselected slots in said stator shell, and said base of said outer flange having a still lesser number of radially extending slots which are adapted for registration with certain other preselected slots in said stator shell, a plurality of rectangular loops of winding wire vertically wound in selected pairs of registering shell and cap slots with the upper and lower sections of said loops being disposed in the said outer zones of said end caps, a plurality of other rectangular loops of winding wire vertically wound into other selected pairs of registering shell and cap slots with the upper and lower sections of said other loops being disposed in the said intermediate zones of said end caps, and a plurality of still other rectangular loops of winding wire vertically wound into still other selected pairs of registering shell and cap slots with the upper and lower sections of said still other loops being disposed in the said inner zones of said end caps.

10. A stator as defined in claim 9 in which the said annular flanges of said end caps progressively increase in diameter from the bases of said end caps outwardly.

11. A stator as defined in claim 10 in which said annular flanges of said end caps progressively increase in height from the innermost flange outwardly.

12. An end cap for stators as defined in claim 8 in which the said annular flanges progressively increase in diameter from said base upwardly.

13. An end cap for stators as defined in claim 12 in which said annular flanges progressively increase in height from the innermost flange outwardly.

No references cited.